United States Patent [19]

Klemen et al.

[11] Patent Number: 5,233,878
[45] Date of Patent: Aug. 10, 1993

[54] CLOSED LOOP CONTROL FOR TRANSMISSION SHIFT FORK POSITION

[75] Inventors: Donald Klemen; Joseph H. Hunter, both of Carmel, Ind.

[73] Assignee: General Motors Corporation, Detroit, Mich.

[21] Appl. No.: 920,744

[22] Filed: Jun. 1, 1992

[51] Int. Cl.⁵ .................. F15B 11/08; F16H 63/30
[52] U.S. Cl. ................................. 74/346; 91/422
[58] Field of Search ................ 91/361, 422, 444, 448; 137/625.6; 74/335, 346; 192/856, 86, 87.1, 87.14, 87.18

[56] References Cited

U.S. PATENT DOCUMENTS

| | | | |
|---|---|---|---|
| 2,157,328 | 5/1939 | Durham | 74/346 X |
| 2,157,592 | 5/1939 | Caster | 74/346 |
| 2,388,088 | 10/1945 | Sanford et al. | 74/346 |
| 2,926,635 | 3/1960 | Leonard et al. | 121/41 |
| 3,185,040 | 5/1965 | Ligon | 91/277 |
| 3,896,914 | 7/1975 | Konsbruck et al. | 192/0.098 |
| 4,603,596 | 8/1986 | Akashi et al. | 74/336 R |
| 4,627,312 | 12/1986 | Fujieda et al. | 74/866 |
| 4,722,237 | 2/1988 | McNinch, Jr. | 74/346 |
| 5,136,929 | 8/1992 | Kervagoret | 91/422 X |
| 5,163,353 | 11/1992 | Horstmann et al. | 91/448 X |

Primary Examiner—Leslie A. Braun
Assistant Examiner—Khoi Q. Ta
Attorney, Agent, or Firm—Kevin M. Hinman

[57] ABSTRACT

A hydraulic closed loop control for positioning a transmission shift rail and synchronizer fork has recesses on the rail and ports in a valve body in which the rail is disposed. Fluid flow between the ports as permitted by the rail recesses controls the position of valves which in turn control the position of the rail. The valves control the position of the rail by routing pressurized fluid to one of two opposing sides of a piston fixed to the rail in response to the flow of fluid from the valve body ports. The pressurized fluid moves the rail to a desired position with the flow of pressurized fluid being interrupted when that position is reached.

4 Claims, 2 Drawing Sheets

5,233,878

CLOSED LOOP CONTROL FOR TRANSMISSION SHIFT FORK POSITION

TECHNICAL FIELD

This invention is in the field of torque transmitting devices, such as transmissions, gear splitters, and transfer cases employing shift forks to move a synchronizer sleeve. More specifically, this invention relates to closed loop controls used for hydraulically positioning shift forks within such torque transmitting devices.

BACKGROUND OF THE INVENTION

Closed loop controls that position a shift fork and rail within a transmission are known in the art of transmissions. One arrangement has provisions for hydraulically displacing the rail and fork, in combination with electrical contacts on the rail. The electrical contacts provide signals to an electronic controller, the signals indicating the rail's current position relative to a target position. The controller reduces or eliminates the force applied to the fork in response to signals indicating that the fork has reached the target position. With such controls, there is a need to package electrical contacts proximate to and on the shift rails, and for the electronic controller to process the signals from the contacts and in turn to direct hydraulic fluid as required.

SUMMARY OF THE INVENTION

This invention provides a hydraulically operated closed loop control for positioning a shift fork and shift rail to a desired position and, upon the shift fork and rail reaching that position, reducing a hydraulic apply force to zero. This invention eliminates the need for electrical contacts on or proximate to the rail. This invention also allows the electronic controller to run open loop with respect to the position of the shift fork and rail. No electrical signal back to the controller is required for positioning of the rail. Position control of the rail is instead achieved hydraulically. The rail is slidably disposed in the valve body.

Recesses formed on the shift rail selectively connect orifices in the valve body to provide hydraulic feedback signals in the form of pressurized fluid to valves. The valves provide pressurized fluid to a piston fixed to the rail. The valves respond to the signals from the recesses and orifices, interrupting the flow of pressurized hydraulic fluid flow to the piston when the rail is in the desired position, and restoring the hydraulic fluid flow if the shift rail is not in the desired position.

It is an object of this invention to provide an improved closed loop control for axial positioning of a shift rail and an attached shift fork.

It is also an object of this invention to provide an improved closed loop control for axial positioning of a shift rail using pressurized hydraulic fluid to displace the shift rail in response to pressurized hydraulic fluid being supplied to a piston fixed to the rail, the resultant hydraulic force against the rail being relieved after a desired position of the rail has been reached, having a mechanical detent retaining the rail in the desired position, the control being able to restore the rail to the desired position should the rail escape the desired position.

These and other objects and advantages will be more apparent from the following description and drawings.

DESCRIPTION OF THE PREFERRED EMBODIMENT

Figure 1:
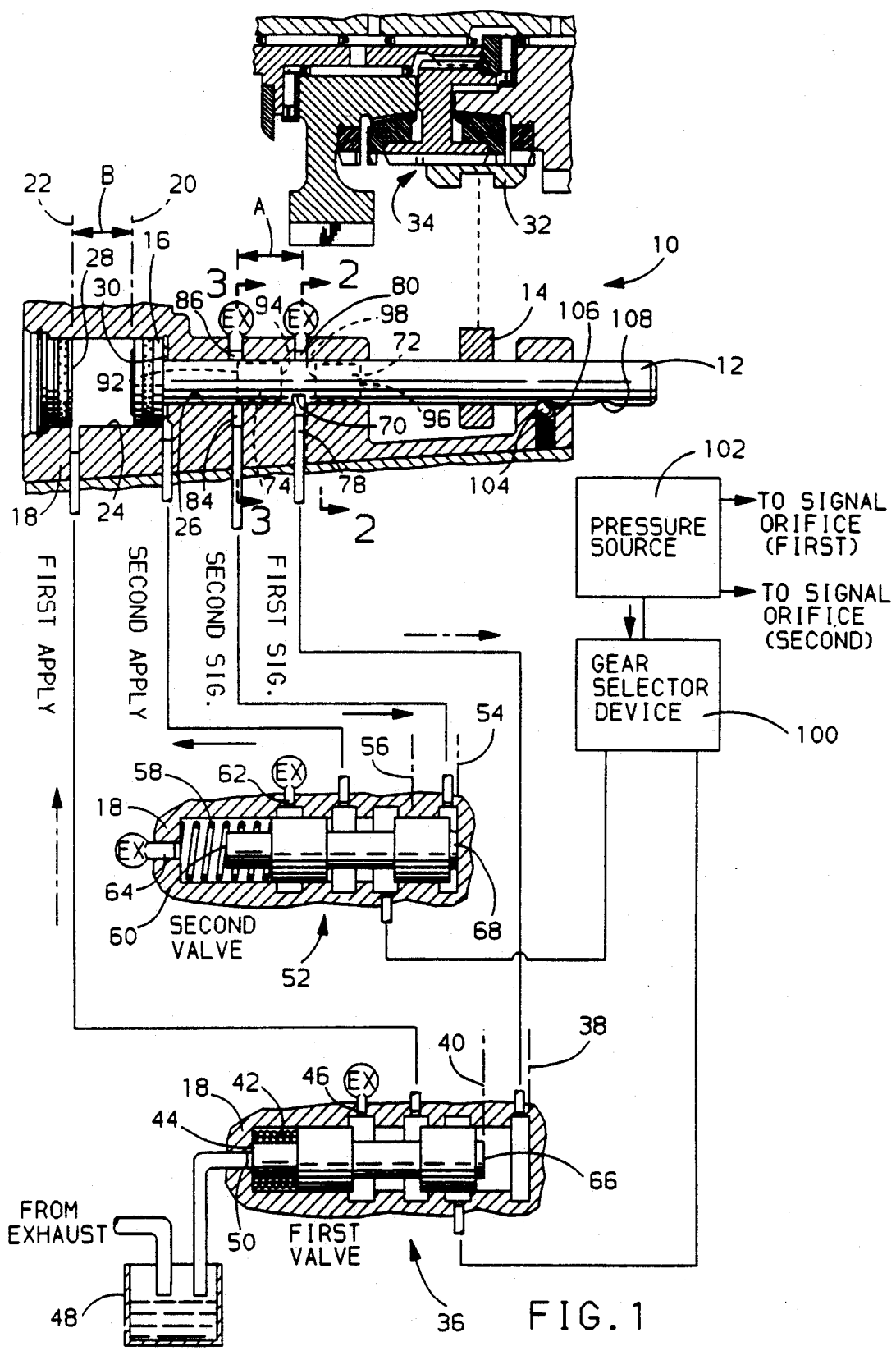
FIG. 1 shows a schematic sectional side view of a closed loop control for positioning a shift rail.

FIG. 1 shows a closed loop control 10 for axial positioning of a shift rail 12 and an attached shift fork 14.

A piston 16 is fixed to an end of the shift rail 12. The rail 12 and piston 16 are slidably disposed within a valve body 18 inside which they 12, 16 can axially translate between a first position 20 and a second position 22. The valve body 18 has a piston chamber 24 and a rail chamber 26. The piston chamber 24 has a first end 28 and a second end 30. When the piston 16 and rail 12 are in the first position 20, the piston 16 is at the second end 30 of the piston chamber 24. When the piston 16 and rail 12 are in the second position 22, the piston 16 is at the first end 28 of the piston chamber 24.

The shift fork 14 is fixed to the rail 12. The shift fork 14 is axially linked with a sleeve 32 of a gear change synchronizer 34.

There is a first valve 36 disposed within the valve body 18. The first valve 36 has an apply position 38 and an exhaust position 40. The first valve 36 is biased toward the apply position 38 by a first spring 42 at a first end 44 of the first valve 36. In the apply position 38, the first valve 36 communicates pressurized fluid to the first end 28 of the piston chamber 24, thereby displacing the piston 16 and rail 12 to the first position 20. In the exhaust position 40, the first valve 36 interrupts the flow of pressurized fluid to the first end 28 of the piston chamber 24 and fluidly connects the first end 28 of the piston chamber 24 to a first valve exhaust orifice 46 leading to a sump 48. A first spring chamber exhaust orifice 50 is provided in the valve body 18 to exhaust fluid trapped on the first end 44 of the first valve 36 when the first valve 36 is moved to the exhaust position 40.

A second valve 52 is disposed within the valve body 18. The second valve 52 has an apply position 54 and an exhaust position 56. The second valve 52 is biased toward the apply position 54 by a second spring 58 at a first end 60 of the second valve 52. In the apply position 54, the second valve 52 communicates pressurized fluid to the second end 30 of the piston chamber 24, thereby displacing the piston 16 and rail 12 to the second position 22. In the exhaust position 56, the second valve 52 interrupts the flow of pressurized fluid to the second end 30 of the piston chamber 24 and fluidly connects the second end 30 of the piston chamber 24 to a second valve exhaust orifice 62 leading to the sump 48. A second spring chamber exhaust orifice 64 is provided in the valve body 18 to exhaust fluid trapped on the first end 60 of the second valve 52 when the second valve 52 is moved to the exhaust position 56.

The rail 12 and valve body 18 cooperate to provide a means for moving the first valve 36 from the apply position 38 to the exhaust position 40. When the piston 16 and rail 12 enter the first position 20, the rail 12 and valve body 18 communicate pressurized fluid to a second end 66 of the first valve 36. The pressurized fluid overcomes the first spring 42, moving the first valve 36 toward the exhaust position 40.

The rail 12 and valve body 18 also cooperate to provide a means for moving the second valve 52 from the apply position 54 to the exhaust position 56. When the piston 16 and rail 12 enter the second position 22, the rail 12 and valve body 18 communicate pressurized fluid to a second end 68 of the second valve 52. The pressurized fluid overcomes the second spring 58, moving the second valve 52 toward the exhaust position 56.

The rail 12 generally blocks fluid from entering the rail chamber 26. The rail 12 has three surface recesses: a signal recess 70, a first exhaust recess 72, and a second exhaust recess 74. Fluid is able to enter the rail chamber 26 at the location of those recesses. The two exhaust recesses 72, 74 are axially disposed on either side of the signal recess 70 with the second exhaust recess 74 being the closest of the three recesses 70, 72, 74 to the piston 16.

Figure 2:
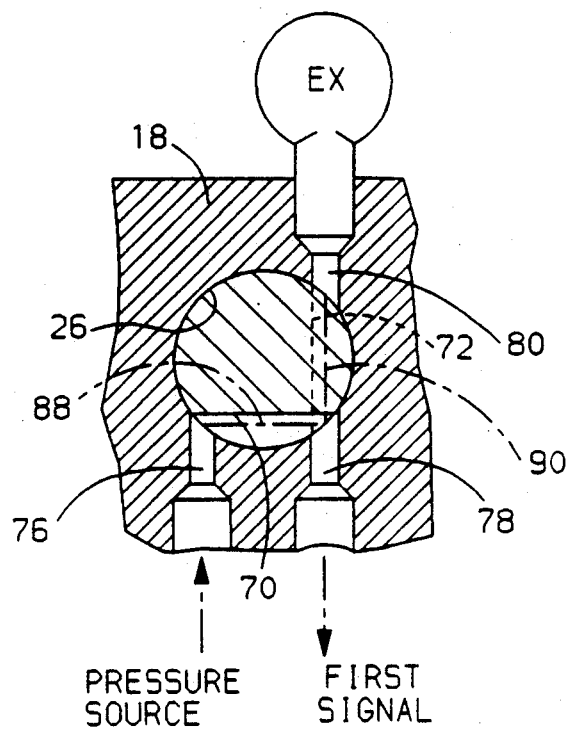
FIG. 2 shows a sectional view of the shift rail and a valve body in the direction of arrows 2 in FIG. 1.
Figure 3:
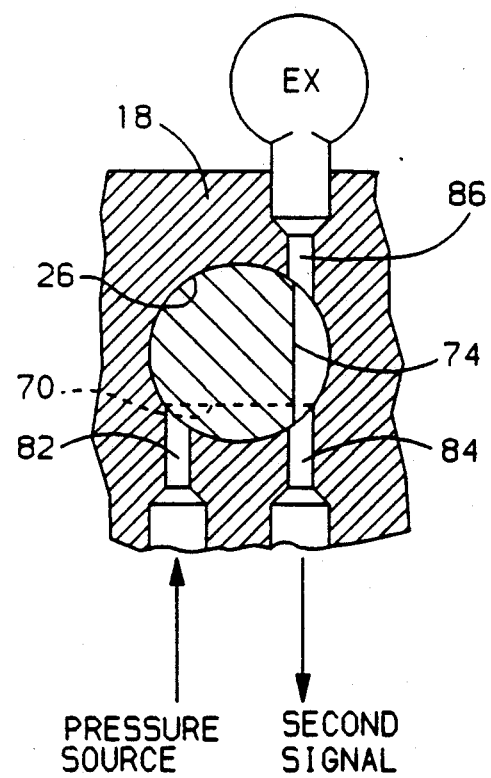
FIG. 3 shows a sectional view of the shift rail and the valve body in the direction of arrows 3 in FIG. 1.

The valve body 18 has six ports, best seen in FIG. 2 and FIG. 3, entering the rail chamber 26. There are three first ports: a first pressure port 76 through which pressurized fluid is supplied, a first signal port 78 fluidly connected with the second end 66 of the first valve 36, and a first exhaust port 80 fluidly connected to the sump 48. There are also three second ports: a second pressure port 82 through which pressurized fluid is supplied, a second signal port 84 fluidly connected with the second end 68 of the second valve 52, and a second exhaust port 86 fluidly connected to the sump 48.

The first ports 76, 78, 80 are axially proximate to one another. The first ports 76, 78, 80 are circumferentially oriented at the rail chamber 26 such that a line 88 between first pressure port 76 and the first signal port 78 an angle of approximately 90 with a line 90 between the first signal port 78 and the first exhaust port 80.

The second ports 82, 84, 86 are also axially proximate to one another and are axially separated from the first ports 76, 78, 80 by a distance A equaling an available piston travel B from the first position 20 to the second position 22. The second ports 82, 84, 86 are circumferentially aligned at the rail chamber 26 with the corresponding first ports 76, 78, 80.

The rail 12 has the recesses 70, 72, 74 circumferentially oriented to allow selective fluid communication between the first ports 76, 78, 80, and between the second ports 82, 84, 86. The first signal port 78 and the first exhaust port 80 are fluidly connected when the first exhaust recess 72 is axially aligned with the first ports 76, 78, 80. The second signal port 84 and the second exhaust port 86 are fluidly connected when the second exhaust recess 74 is axially aligned with the second ports 82, 84, 86. The signal recess 70 provides fluid communication between the first pressure port 76 and the first signal port 78 when the signal recess 70 is aligned with the first ports 76, 78, 80. The signal recess 70 also provides fluid communication between the second pressure port 82 and the second signal port 84 when the signal recess 70 is aligned with the second ports 82, 84, 86.

When the piston 16 and rail 12 are in the first position 20, the first pressure port 76 is fluidly connected with the first signal port 78 by the signal recess 70, thereby communicating pressurized fluid to the second end 66 of the first valve 36, displacing it 36 to the exhaust position 40. The second exhaust port 86 is connected with the second signal port 84 by the second exhaust recess 74, relieving any residual pressure on the second end 68 of the second valve 52, and allowing the second spring 58 to displace the second valve 52 to the apply position 54.

The second exhaust recess 74 extends axially from a second distal edge 92 axially aligned with the second ports 82, 84, 86 when the piston 16 and rail 12 are in the first position 20, to a second proximate edge 94 proximate to the signal recess 70. The second exhaust recess 74 fluidly connects the second exhaust port 86 with the second signal port 84 over a corresponding range of piston and rail travel.

When the piston 16 and rail 12 are in the second position 22, the second pressure port 82 is fluidly connected with the second signal port 84 by the signal recess 70 in the rail 12, thereby communicating pressurized fluid to the second end 68 of the second valve 52, displacing it 52 to the exhaust position 56. The first exhaust port 80 is fluidly connected with the first signal port 78 by the first exhaust recess 72, relieving any residual pressure on the second end 66 of the first valve 36, and allowing the first spring 42 to displace the first valve 36 to the apply position 38.

The first exhaust recess 72 extends axially from a first distal edge 96 axially aligned with the first ports 76, 78, 80 when the piston 16 and rail 12 are in the second position 22, to a first proximate edge 98 proximate to the signal recess 70. The first exhaust recess 72 fluidly connects the first exhaust port 80 with the first signal port 78 over a corresponding range of piston 16 and rail 12 travel.

The signal recess 70 is axially aligned with the first ports 76, 78, 80 in the first position 20 and is axially aligned with the second ports 82, 84, 86 in the second position 22, having an axial width C sufficient to provide fluid communication between the respective pressure ports 76, 82 and signal ports 78, 84 only when the piston 16 and rail 12 are in one of the first and second positions 20, 22.

A means for selectively porting pressurized fluid to one of the first valve 36 and the second valve 52 is provided by a gear selector device 100, the details of which are beyond the scope of this invention. A solenoid could provide such a function, being selectively cycled from a first position directing pressurized fluid to the first valve 36, to a second position directing fluid to the second valve 52. A pressure source 102 provides pressurized fluid to the gear selector device 100, as well as providing a continuous flow of pressurized fluid to the first pressure port 76 and to the second pressure port 82 in the valve body 18.

The rail 12 has a mechanical detent means provided by a spring loaded ball 104 disposed in the valve body 18 acting against first and second notches 106, 108 in the rail 12 to restrict translation of the rail 12 from the first position 20 and the second position 22. The first notch 106 is aligned with the ball 104 when the piston 16 and rail 12 are in the first position 20. The second notch is 108 aligned with the ball 104 when the piston 16 and rail 12 are in the second position 22.

The following description of the operation of the invention further explains how the above described elements cooperate to provide the desired function of positioning the shift rail 12.

The piston 16 and rail 12 are moved between the first position 20 and the second position 22. FIG. 1 shows the piston 16 and rail 12 at equilibrium in the first position 20. The first valve 36 is in the exhaust position 40 with the first spring 42 compressed. The second valve 52 is in the apply position 54. The gear selector device 100 routes pressurized fluid to the first valve 36, with no fluid being routed to the second valve 52. The first valve 36 blocks the flow of pressurized fluid from reaching the piston 16. Any residual pressure against the piston 16 in the piston chamber 24 is relieved by the first valve 36 which connects the chamber 24 to the first valve exhaust orifice 46 which is fluidly connected to the sump 48.

Pressurized fluid is passed from the first pressure port 76 of the valve body 18 through the signal recess 70 in the rail 12 to the first signal port 78 of the valve body as shown in FIG. 2. The pressurized fluid then passes to the second end 66 of the first valve 36, holding it 36 in the exhaust position 40 against the force of the first spring 42. The spring loaded ball 104 is engaged with the first notch 106 in the rail 12, holding the rail 12 in the first position 20.

The control 10 restores the piston 16 and rail 12 to the selected position 20, 22 if they 12, 16 should be displaced away from the selected position 20, 22. When the rail 12 is moved from the selected position 20, 22 without a corresponding change in the valve to which the gear selector device 100 ports fluid, the control 10 will force the rail 12 to return to the first position 20.

When the rail 12 is moved from the first position 20, the pressure source 102 is no longer able to provide fluid through the first signal port 78 to the second end 66 of the first valve 36 because the signal recess 70 in the rail 12 is no longer aligned with both the first signal port 78 and the first pressure port 76, preventing them 76, 78 from communicating with each other. Because the first exhaust recess 72 is in close axial proximity to the signal recess 70, the first signal port 78 is connected to the first exhaust port 80 almost as soon the flow of pressurized fluid to the first signal port 78 is interrupted.

When the first signal port 78 is connected to the first exhaust port 80, the first spring 42 overcomes the fluid force, with the first valve 36 being moved to the apply position 38. With the first valve 36 in the apply position 38, the pressurized fluid from the gear selector device 100 flows to the first end 28 of the piston chamber, forcing the piston 16 back toward the first position 20. When the piston 16 and rail 12 and synchronizer sleeve 32 reach the first position 20, the control 10 returns to the equilibrium condition where the first valve 36 is again in the exhaust position 40 and the pressure on the piston 16 is returned to zero.

When the gear selector device 100 redirects fluid from the first valve 36 to the second valve 52, simultaneously connecting the first valve 36 with a selector device exhaust port (not shown), the piston 16 and rail 12, and therefore the synchronizer sleeve 32, are moved from the first position 20 to the second position 22.

The pressurized fluid directed by the gear selector device 100 goes to the second valve 52, passes to the second end 30 of the piston chamber 24 and the piston 16 begins to stroke toward the second position 22, overcoming the spring loaded ball 104 at the first notch 106. Because the first valve 36 is already in the exhaust position 40, fluid between the piston 16 and the first end 28 of the piston chamber 24 will initially be pushed out through the first valve exhaust port 46 when the shift is made.

When the rail 12 is only a short distance out of the first position 20, however, the first valve 36 will move to the apply position 38 as the first spring 42 overcomes the fluid on the second end 66 of the first valve 36. The fluid on the second end 66 of the first valve 36 is able to escape through the first exhaust port 80 because the first signal port 78 has been fluidly connected with the first exhaust port 80 by the first exhaust recess 72 in the rail 12 which is now axially aligned with the first ports 76, 78, 80.

Once the first valve 36 is in the apply position 38 the fluid between the first end 28 of the piston chamber 24 and the piston 16 can no longer pass through the first valve exhaust orifice 46. The volume of fluid remaining between the piston 16 and the first end 28 of the piston chamber 24 escapes past the first valve 36 through the selector device exhaust port.

When the piston 16 and rail 12 reach the second position 22, the spring loaded ball 104 engages the second notch 108 in the rail 12, and the signal recess 70 in the rail 12 is axially aligned with the second ports 82, 84, 86, fluidly connecting the second pressure port 82 with the second signal port 84. Fluid is passed to the second end 68 of the second valve 52, moving it 52 to the exhaust position 56, and interrupting the flow of pressurized fluid to the piston 16, allowing the fluid to escape from the piston chamber 24 through the second valve exhaust orifice 62.

The shift rail 12 will be restored to the second position 22 if displaced from the second position 22 as long as the gear selector 100 continues to direct fluid toward the second valve, just as the rail 12 is restored to the first position 20 if moved out of the first position 20 when the gear selector device 100 continues to direct fluid toward the first valve 36.

A shift back to the first position 20 from the second position 22 would be carried out in the same fashion as the shift from the first 20 to the second 22, but in the opposite direction. When the gear selector 100 redirects the fluid away from the second valve 52 toward the first valve 36, the second valve 52 is connected with the selector device exhaust port and the piston 16 and rail 12 move back toward the first position.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A closed loop control for axial positioning of a shift rail, comprising:
   the shift rail;
   a piston fixed to the shift rail;
   a valve body within which the piston and rail are slidably disposed for axial translation between a first position and a second position, having a piston chamber and a connecting rail chamber, the piston chamber having a first end and a second end such that when the piston and rail are in the first position, the piston is at the second end of the piston chamber and when the piston and rail are in the second position, the piston is at the first end of the piston chamber;
   a first valve, having an apply position and an exhaust position, biased toward the apply position,
     in the apply position communicating pressurized fluid to the first end of the piston chamber and thereby displacing the piston and rail to the first position, and in the exhaust position interrupting the flow of pressurized fluid to the first end of the piston chamber and fluidly connecting the first end of the piston chamber to an exhaust orifice leading to a sump;

a first spring at a first end of the first valve biasing the first valve toward the apply position;

means for moving the first valve from the apply position to the exhaust position when the piston and rail enter the first position selectively communicating pressurized fluid to a second end of the first valve when the shift rail enters the first position, the pressurized fluid overcoming the first spring to move the first valve toward the exhaust position;

a second valve, having an apply position and an exhaust position, biased toward the apply position,
  in the apply position communicating pressurized fluid to the second end of the piston chamber and thereby displacing the piston and rail to the second position, and
  in the exhaust position interrupting the flow of pressurized fluid to the second end of the piston chamber and fluidly connecting the second end of the piston chamber to an exhaust orifice leading to the sump;

a second spring at a first end of the second valve biasing the second valve toward the apply position;

means for selectively providing pressurized fluid to one of the first valve and the second valve;

means for moving the second valve from the apply position to the exhaust position when the piston and rail enter the second position selectively communicating pressurized fluid to a second end of the second valve when the shift rail enters the second position, the pressurized fluid overcoming the second spring to move the second valve toward the exhaust position; and mechanical detent means for restricting translation of the rail from the first position and the second position.

2. A closed loop control for axial positioning of a rail as claimed in claim 1, further comprising:
  the means for moving the first valve from the apply position to the exhaust position by selectively communicating pressurized fluid to the second end of the first valve being provided by the rail cooperating with the valve body;
  the means for moving the second valve from the apply position to the exhaust position by selectively communicating pressurized fluid to the second end of the second valve being provided by the rail cooperating with the valve body.

3. A closed loop control for axial positioning of a rail as claimed in claim 2, further comprising features of the valve body and the rail which facilitate their cooperation to selectively communicate pressurized fluid to the second end of the first valve and to selectively communicate pressurized fluid to the second end of the second valve, those features comprising:
  the rail generally blocking fluid from entering the rail chamber;
  the valve body having six ports entering the rail chamber, with three first ports,
    a first pressure port through which pressurized fluid is supplied,
    a first signal port fluidly connected with the second end of the first valve, and
    a first exhaust port fluidly connected to a sump, the first ports being axially proximate to one another, and with three second ports,
    a second pressure port through which pressurized fluid is supplied,
    a second signal port fluidly connected with the second end of the second valve, and
    a second exhaust port fluidly connected to a sump, the second ports being axially proximate to one another;
  the rail having three surface recesses, the recesses being a signal recess, a first exhaust recess, and a second exhaust recess, with the signal recess axially disposed on the rail between the first exhaust recess and the second exhaust recess; and
  the recesses oriented such that when the piston and rail are in the first position, the first pressure port is fluidly connected with the first signal port by the signal recess in the rail thereby communicating pressurized fluid to the second end of the first valve, displacing it to the exhaust position, and the second exhaust port is connected with the second signal port by the second exhaust recess relieving any residual pressure on the second end of the second valve, allowing the second spring to displace the second valve to the apply position and when the piston and rail are in the second position the second pressure port is fluidly connected with the second signal port by the signal recess in the rail thereby communicating pressurized fluid to the second end of the second valve, displacing it to the exhaust position, the first exhaust port is connected with the first signal port by the first exhaust recess, relieving any residual pressure on the second side of the first valve, allowing the first spring to displace the first valve to the apply position.

4. A closed loop control for axial positioning of a rail as claimed in claim 3, further comprising:
  valve body
    the first ports being circumferentially oriented at the rail chamber such that a line between the first pressure port and the first signal port forms an angle of approximately 90° with a line between the first signal port and the first exhaust port,
    the second ports being circumferentially aligned with the corresponding first ports at the rail chamber, axially separated from the first ports by a distance equaling an available piston travel from the first position to the second position; and
  the rail having:
    the first exhaust recess axially extending from a first distal edge axially aligned with the first ports when the piston and rail are in the second position, to a first proximate edge proximate to the signal recess, thereby fluidly connecting the first exhaust port with the first signal port over a corresponding range of piston and rail travel,
    the second exhaust recess axially extending from a second distal edge axially aligned with the second ports when the piston and rail are in the first position, to a second proximate edge proximate to the signal recess, thereby fluidly connecting the second exhaust port with the second signal port over a corresponding range of piston and rail travel, and
    the signal recess being axially aligned with the first ports in the first position and axially aligned with the second ports in the second position, having an axial width sufficient to provide fluid communication between the respective pressure ports and signal ports only when the piston and rail are in the first and second positions.

* * * * *